US005137997A

United States Patent [19]

Conroy et al.

[11] Patent Number: 5,137,997

[45] Date of Patent: Aug. 11, 1992

[54] OLEFIN POLYMERIZATION CATALYSTS AND PROCESSES

[75] Inventors: Brian K. Conroy, Batavia, Ill.; Paul D. Smith, Seabrook, Tex.

[73] Assignee: Phillips Petroleum Company, Bartlesville, Okla.

[21] Appl. No.: 829,493

[22] Filed: Feb. 3, 1992

Related U.S. Application Data

[62] Division of Ser. No. 688,974, Apr. 22, 1991, Pat. No. 5,104,841.

[51] Int. Cl.[5] .................. C08F 4/42

[52] U.S. Cl. .................. 526/126; 526/352; 526/348.5; 502/158; 502/167

[58] Field of Search .................. 526/126

[56] References Cited

U.S. PATENT DOCUMENTS

| | | | |
|---|---|---|---|
| 3,157,712 | 11/1964 | Walker et al. | 260/683.15 |
| 4,146,694 | 3/1979 | Hwang et al. | 526/96 |
| 4,444,963 | 4/1984 | McDaniel et al. | 526/100 |

*Primary Examiner*—Joseph L. Schofer
*Assistant Examiner*—David Wu
*Attorney, Agent, or Firm*—Laney, Dougherty, Hessin & Beavers

[57] ABSTRACT

Olefin polymerization catalysts, processes for preparing the catalysts and processes for producing polyolefins utilizing the catalysts are provided. The catalysts are basically comprised of a trialkylsilylamide-chromium complex adsorbed on an activated inorganic compound.

16 Claims, No Drawings

OLEFIN POLYMERIZATION CATALYSTS AND PROCESSES

This is a divisional of copending application Ser. No. 07/688,974 filed on Apr. 22, 1991, now U.S. Pat. No. 5,104,841.

BACKGROUND OF THE INVENTION

1. Field of the Invention

The present invention relates to olefin polymerization catalysts and processes, and more particularly, to novel supported trialkylsilylamide-chromium catalysts, their preparation and use for polymerizing olefins.

2. Description of the Prior Art

A great variety of olefin polymerization catalysts have been developed and used heretofore. Such catalysts can be broadly classified into three groups: the Ziegler catalysts of the type described in Belgium Patent 533,362 issued in 1954; the Phillips Petroleum Company silica supported chromium catalysts as described, for example, in U.S. Pat. Nos. 2,825,721 and 2,846,425 issued in 1958, U.S. Pat. No. 2,951,816 issued in 1960, U.S. Pat. No. 3,887,494 issued in 1975, U.S. Pat. No. 4,119,569 issued in 1978 and U.S. Pat. No. 4,151,122 issued in 1979; and the supported organo-transition metal catalysts of the types described in U.S. Pat. No. 3,709,853 issued in 1973, U.S. Pat. No. 3,806,500 and U.S. Pat. No. 3,840,508 issued in 1974 and U.S. Pat. No. 4,018,707 issued in 1977.

The supported organo-transition metal catalysts include organo-chromium complexes such as bis-($\eta$-cyclopentadienyl) chromium, bis-($\eta^6$-arene) chromium, tri-($\eta^3$-allyl) chromium and tetrakis-($\eta^3$-allyl) dichromium supported on inorganic oxide refractory compounds such as silica, alumina, zirconia and thoria. Another class of supported organo-transition metal catalysts is comprised of tetravalent titanium and zirconium compounds of the formula $ML_nX_{4-n}$ wherein M is titanium or zirconium, L is $-CH_2C_6H_5$, $-CH_2Si(CH_3)_3$ or $-C_3H_5$, and X is chlorine or bromine supported on inorganic oxides. In the use of the various organo-transition metal catalysts, the particular transition metal, the organic ligands and the inorganic refractory supports used all influence the properties of the resulting polymers.

By the present invention, supported trialkylsilylamidechromium olefin polymerization catalysts are provided, the use of which results in the production of polymers having desired properties.

SUMMARY OF THE INVENTION

The present invention provides novel supported trialkylsilyl amide-chromium catalysts, processes for producing such catalysts and processes for using the catalysts for polymerizing olefins. The catalysts are comprised of chromium complexed with a trialkylsilyl compound and supported on an activated inorganic refractory compound. A preferred complex is bis-(trimethylsilylamide) chromium, and the activated inorganic refractory support is preferably selected from inorganic oxides and metal phosphates. The most preferred inorganic oxides are selected from the group consisting of phosphated alumina, silica, fluorinated silica-alumina, and fluorinated alumina. The most preferred metal phosphate is aluminum phosphate.

A supported trialkylsilylamide-chromium catalyst of the present invention is prepared by activating an inorganic refractory compound, and then contacting the activated inorganic refractory compound with a trialkylsilylamide-chromium complex under conditions whereby the complex is adsorbed on the refractory compound. The resulting catalyst is optionally calcined in air prior to use.

In preparing polyolefins using a supported trialkylsilylamide-chromium catalyst of this invention, one or more olefins are contacted with a catalytic amount of the catalyst at polymerization conditions. The olefins are preferably ethylene alone or ethylene and a minor amount of a higher olefin, and the catalyst is preferably bis-(trimethylsilylamide) chromium supported on phosphated alumina which has been activated by calcination in air.

It is, therefore, a general object of the present invention to provide novel supported trialkylsilylamide-chromium oxides and metal phosphates. Examples of preferred inorganic oxides are alumina and silica. Preferred metal phosphates are the aluminum phosphates, e.g., aluminum orthophosphate, pyrophosphate and polyphosphates. The supports can also be modified by the addition of fluorides, phosphates and phosphites as known in the art. Of the various inorganic refractory compounds which can be used, a compound selected from phosphated alumina, silica, fluorinated silica-alumina, aluminum phosphate and fluorinated alumina is preferred. The most preferred inorganic refractory compound for use in accordance with this invention is phosphated alumina.

The inorganic refractory compounds utilized as supports for the trialkylsilylamide-chromium complexes are generally activated by calcining the compounds in air at elevated temperatures, e.g., temperatures in the range of from about 300° C. to about 800° C. for time periods of from about one-half hour to about twenty-four hours. The calcining procedure can be accomplished in a fluidized bed which, after being heated at the temperature and for the time mentioned above, is cooled to a temperature in the range of from about 40° C. to about 50° C. The air is then displaced from the fluidized bed by dry argon or nitrogen followed by cooling to room temperature. The calcined support compounds can be stored under the inert gas in closed containers until ready for use.

In preparing the supported trialkylsilylamide-chromium catalysts of this invention, the activated inorganic refractory compound used is contacted with a trialkylsilyl amidechromium complex under conditions whereby the complex is adsorbed on the refractory compound. Generally, the activated support compound is impregnated with the trialkylsilylamide-chromium complex dissolved in an organic solvent under dry, air-free conditions. The catalysts so prepared can be washed several times with a hydrocarbon such as n-pentane and charged to a reactor in slurry form, or they can be dried and used as free flowing powders.

In order to change the properties of the catalyst produced as above, it can be subjected to a final calcination step after being dried. That is, the dried supported trialkylsilylamide-chromium catalyst can be calcined in air at a temperature in the range of from about 300° C. to about 800° C. for a time period in the range of from about 0.5 hours to about 24 hours, preferably at a temperature of about 600° C. for a time period of about 2 hours. This final calcination can also be accomplished in a fluidized bed as described above. After being calcined the catalyst is stored under argon or nitrogen until ready for use.

Thus, the process of the present invention for preparing an olefin polymerization catalyst of the invention, i.e., a trialkylsilylamide-chromium complex supported on an inorganic refractory compound, is comprised of the steps of activating the inorganic refractory compound, generally by calcining it in air, and then contacting the activated inorganic refractory compound with the trialkylsilylamidechromium complex under conditions whereby the complex is adsorbed on the refractory compound. The resulting supported trialkylsilylamide-chromium catalyst can optionally be calcined in air as a final preparation step.

The supported trialkylsilylamide-chromium complex of this invention can be employed in various olefin polymerization processes wherein one or more olefin monomers, generally having from about 2 to about 8 carbon atoms is contacted with a catalytic amount of the catalyst under polymerization conditions. Preferably, the olefin monomers are comprised of ethylene alone or ethylene and a minor amount of a higher olefin, e.g., propylene. The polymerization reaction is preferably carried out under slurry (particle forming) conditions. The reaction medium can be a dry inert hydrocarbon such as isobutane, n-heptane, methylcyclohexane or benzene and the polymerization reaction can be carried out at a reactor temperature within the range of from about 60° C. to about 110° C. and a reactor pressure of about 250 psig to about 600 psig. The polyolefin produced can be recovered, treated with carbon dioxide or water to deactivate residual catalyst, stablized with an antioxidant such as butylated hydroxy toluene (BHT), and dried by conventional methods to obtain the final product. Hydrogen can be used in the reactor as known in the art to provide some control of the molecular weight of the polymer.

The process of the present invention can include the first step of contacting an activated inorganic refractory compound with a trialkylsilylamide-chromium complex under conditions whereby the complex is adsorbed on the inorganic refractory compound thereby forming a supported catalyst, followed by the step of contacting one or more olefins with a catalytic amount of the catalyst at polymerizing conditions to form the polyolefins. As indicated above, the process can also include the additional step of calcining the catalyst in air prior to contacting one or more olefins therewith.

In order to further illustrate the novel catalysts of this invention as well as their preparation and use, the following example is given. The particular components utilized in the example are meant to be illustrative of the present invention and not limiting thereto.

EXAMPLE

Supported bis-(trimethylsilylamide) chromium complex catalysts were prepared and tested as follows.

Reagents and General Procedures

Anhydrous chromium (II) chloride and lithium aluminum hydride were purchased from Alfa Products Co. Lithium bis(trimethylsilyl)amide, benzophenone, and HPLC grade tetrahydrofuran were purchased from Aldrich Chemical Company. All reagents except THF were used without purification. THF was purified by distillation with $LiAlH_4$ and then Na/PhC(0)Ph, and stored over 4Å molecular sieves. Standard inert atmosphere Schlenk and glove box techniques were used under a nitrogen atmosphere.

The infrared spectrum of $Cr[N(SiMe_3)_2]_2(THF)_2$ was recorded on a Perkin-Elmer 297 spectrometer as Nujol mulls between NaCl plates. Infrared spectra of the polymers were recorded on a Perkin-Elmer 580 as thin molded films. Known procedures for the determination of gel-permeation chromatography (GPC) and intrinsic viscosity (IV) data were utilized. Elemental analysis of $Cr[N(SiMe_3)_2]_2(THF)_2$ was determined using a C H N S analyzer built at Phillips Research Center, Bartlesville, Oklahoma.

$Cr[N(SiMe_3)_2]_2(THF)_2$ Preparation

In a Schlenk flask, anhydrous $CrCl_2$(6.145 g, 50.00 mmol) was suspended in THF (ca. 200 ml) and cooled to −10° C. in an ice-acetone bath. $Li[N[SiMe_3)_2]$(1.OM, 100 ml, 100 mmol in hexane) was added dropwise to the stirring green $CrCl_2$/THF mixture. After the complete addition of the lithium amide solution, the reaction mixture was darker green. The mixture was slowly warmed to room temperature while stirring for 2.5 hours, then warmed to 40° C for 2 hours. The volume of the solution was reduced in vacuo and pumped dry the next day. The green residue was extracted with pentane (40 ml aliquots), filtered through a Celite pad, and the dark green solution concentrated until purple crystals began to form. The contents of the flask were warmed to dissolve all solids, and the flask was placed in a freezer for several days. A purple crystalline solid $Cr[N(SiMe_3)_2]_2(THF)_2$ was isolated by filtration and dried in vacuo. Yield 7.775 g, 30.08%. Elemental analysis calculated for $C_{20}H_{52}CrN_2O_2Si_4$ : C,46.47; H,1O.14; N,5.42. Found: C,47.61; H,10.71; N,5.14.

IR($cm^{-1}$): 1253m, 1237m, 1175w, 1030m, 993s, 925w, 860s, 835m, 820s, 772w, 745w, 658m, 610w.

Support Preparations

Commercially available Ketjen Grade B alumina ($Al_2O_3$) and Davison 952 silica ($SiO_2$) were used as supports. Aluminophosphate ($AlPO_4$, P/Al =0.9) was prepared using known techniques, and fluorided-alumina ($F/Al_2O_3$, 1.8 wt% F) was prepared by the addition of a solution of $NH_4HF_2$ in methanol to Ketjen Grade B alumina. Fluorided-silica-alumina ($F/SiO_2/Al_2O_3$, 2.2 wt% F, 3.2 wt% $SiO_2$) was prepared in a similar manner except that Silbond 40 (ethylpolysilicate) was added along with the $NH_4HF_2$/methanol solution to Ketjen Grade B alumina. Phosphated alumina ($P/Al_2O_3$, P/Al =0.1) was prepared by the addition of a 10% $H_3PO_4$/methanol solution to Ketjen Grade B alumina. The three treated aluminas were first dried by gentle heating in air and then by heating in a vacuum oven at 100° C., ca. −70 kPa. The supports were finally sieved through a 35 mesh screen.

The supports were activated by placing up to 25 g into a fritted quartz tube, fluidized with air and calcined at 600° C. for 3 hours. The air stream was switched to nitrogen until the support cooled to ambient temperature. The supports were stored in an $N_2$ atmosphere glove box.

Catalyst Preparations

In a Schlenk flask, purple crystals of $Cr[N(SiMe_3)_2]_2(THF)_2$ were dissolved in hexane producing a light green solution. This solution was transferred, via Teflon cannula, to a second flask containing one of the various supports. The white supports became light green immediately upon contact with the $Cr[N(SiMe_3)_2]_2(THF)_2$/hexane solution. The mixtures were stirred for several hours or overnight and then filtered yielding a light green supported material and a colorless hexane filtrate. The supported materials were washed with hexane (2×20 ml) and dried in vacuo yielding typically a light blue powder. The catalysts were used as free-flowing powders.

Polymerization Condition

All catalysts were tested in ethylene polymerizations carried out in a 1-gallon, stirred Autoclave Engineers reactor at temperatures between 85 and 100° C. under typical slurry (particle form) conditions. Temperature regulation was carried out by controlling the amount of steam and water passing through the cooling jacket of the reactor. The reactor was typically charged with 400–600 mg of catalyst, 1 ml of 1.5 wt% triethylaluminum (TEA), and 2 L of isobutane. The desired amount of hydrogen, if any, was added by measuring the pressure drop from a calibrated supply vessel and recorded as pounds of hydrogen on the reactor. When the reactor had reached the desired temperature of the run, ethylene was added to increase the pressure to 550 psi and held at this pressure for 1 hour by supplying ethylene on demand. The reactor was then cooled, vented, and the polymer removed as a dry powder.

RESULTS AND DISCUSSION

Activity $Cr[N(SiMe_3)_2]_2(THF)_2$ reacts immediately with the hydroxyl groups on the surface of calcined (600° C.) $SiO_2$, $Al_2O_3$, $AlPO_4$, and treated aluminas such as $P/Al_2O_3$, $F/Al_2O_3$, and $F/SiO_2/Al_2O_3$ producing materials of varying shades of light green which typically become light blue upon drying under vacuum. A series of catalysts were prepared as described above with 2 wt % Cr on the support surface and one catalyst was prepared unsupported. The results of the polymerization tests described above using the catalysts are given in Table I below.

TABLE I

Ethylene Polymerization Data Using $Cr[N(SiMe_3)_2]_2(THF)_2$/Support

| Run No. | Support[a] | Temperature (°C.) | Productivity[b] | HLMI[c] |
|---|---|---|---|---|
| 1 | — | 100 | 109 | — |
| 2 | $SiO_2$ | 100 | 41 | 3.45 |
| 3 | $Al_2O_3$ | 90 | 11 | — |
| 4 | $P/Al_2O_3$ | 95 | 220 | 0.38 |
| 5 | $P/Al_2O_3$ | 90 | 275 | 0.38 |
| 6 | $P/Al_2O_3$ | 85 | 566 | 0.02 |
| 7 | $F/SiO_2/Al_2O_3$ | 95 | 179 | 0.22 |
| 8 | $F/SiO_2/Al_2O_3$ | 90 | 72 | 0.13 |
| 9 | $F/SiO_2/Al_2O_3$ | 85 | 141 | 0.06 |
| 10 | $AlPO_4$ | 95 | 196 | 1.86 |
| 11 | $AlPO_4$ | 90 | 207 | 3.06 |
| 12 | $AlPO_4$ | 85 | 93 | 1.03 |
| 13 | $F/Al_2O_3$ | 95 | 104 | 0.09 |
| 14 | $F/Al_2O_3$ | 90 | 156 | 0.04 |
| 15 | $F/Al_2O_3$ | 85 | 154 | 0.01 |

[a]Calcination temperature = 600° C.
[b]Units are in grams of polymer per gram of catalyst per hour.
[c]High Load Melt Index in units of grams per 10 minutes. ASTM D, condition F.

In all cases, the productivities were low, less than or equal to 566 g polymer/g cat/hr. As previously found for other systems, the activities are higher when the chromium species is supported. It is noteworthy that $Cr[N(SiMe_3)_2]_2(THF)_2$ is more active for ethylene polymerization when unsupported than supported on $Al_2O_3$ or $SiO_2$. This is an exception to the rule that most organochromium complexes are much more active supported than unsupported. Some possible reasons for these low activities are the presence of THF and $HN(SiMe_3)_2$, byproducts of the reaction between $Cr[N(SiMe_3)_2]_2(THF)_2$ and the support surfaces, which would likely act as poisons if not removed. The catalysts were washed with hexane to remove any free amine or ether. This would not, however, remove amine or ether which was previously bound to the catalyst. As shown in Table VI below, a final calcination of a $P/Al_2O_3$ supported catalyst increases the productivity thereof.

Polymerization temperature sometimes has a pronounced affect on productivity, especially in the case of $P/Al_2O_3$. The productivity increased 25% by dropping the temperature from 95 to 90° C. and 105% by dropping the temperature from 90 to 85° C.

Hydrogen Sensitivity and Molecular Weight Distribution $Cr[N(SiMe_3)_2]_2(THF)_2$ on $F/SiO_2/Al_2O_3$ was evaluated for hydrogen sensitivity. The results of this study are shown in Table II below.

TABLE II

Hydrogen Sensitivity of $Cr[N(SiMe_3)_2]_2(THF)_2$ on $F/SiO_2/Al_2O_3$

| Run No. | $H_2$[a] | MI[c] | HLMI[d] | IV[b] | Shear[e] |
|---|---|---|---|---|---|
| 9 | 0 | 0.01 | 0.06 | 8.26 | — |
| 16 | 10 | 0.04 | .4.51 | 4.39 | 125 |
| 17 | 20 | 0.16 | 22.3 | 2.42 | 138 |
| 18 | 40 | 0.44 | 44.5 | 2.09 | 102 |

[a]Pounds of hydrogen on the reactor.
[b]Intrinsic Viscosity (dl/g).
[c]Melt Index in units of grams/10 minutes. ASTM D1238, condition E.
[d]High Load Melt Index in units of grams/10 minutes. ASTM D, condition F.
[e]Shear ratio (HLMI/MI).

This catalyst is sensitive to hydrogen requiring relatively small pressures of hydrogen to reduce the molecular weight. The resin made without hydrogen has a measured intrinsic viscosity (IV) of 8.26 dl/g. This value steadily decreases through 2.09 dl/g for the resin made with 40 psi hydrogen on the reactor. The shear ratios (HLMI/MI) are quite large suggesting unusually broad molecular weight distributions.

Three of the resins (run numbers 16, 17 and 18) were analyzed by gel-permeation-chromatography (GPC). The molecular weight data are shown in Table III below.

TABLE III

| Run No. | $M_n$ | $M_v$ | $M_w$ | $M_z$ | HI[b] |
|---|---|---|---|---|---|
| | Molecular Weight Data[a] | | | | |
| 16 | 4,040 | 190,300 | 274,600 | 1,652,000 | 68.01 |
| 17 | 3,510 | 162,300 | 256,000 | 2,054,000 | 72.96 |
| 18 | 3,640 | 134,700 | 212,900 | 1,773,000 | 58.48 |

[a]Determined by GPC.
[b]$HI = M_wM_n$.

As shown by the magnitude of the heterogeneity indices (HI =58.48 to 72.96), the molecular weight distributions are extremely broad. The reasons for this are not clear. Possible explanations include the presence of many reactive sites or sites that are somehow changing during the polymerization leading to the observed molecular weight distributions.

End Group Analysis

Table IV below shows the results of an end group analysis by IR.

TABLE IV

| Run No. | $H_2$[a] | End Group Analysis by IR Vinyl/ 1000 C. | Methyl/ 1000 C. | Methyl/ Vinyl | Density (g/cc) |
|---|---|---|---|---|---|
| 4 | 0 | 1.9 | 4.7 | 2.5 | 0.9530 |
| 5 | 0 | 1.7 | 3.0 | 1.8 | 0.9514 |
| 6 | 0 | 1.3 | 3.2 | 2.5 | 0.9484 |
| 7 | 0 | 3.1 | 4.1 | 1.3 | 0.9553 |
| 8 | 0 | 3.1 | 5.1 | 1.6 | 0.9549 |
| 9 | 0 | 2.9 | 4.9 | 1.7 | 0.9536 |
| 10 | 0 | 2.3 | 3.9 | 1.7 | 0.9582 |
| 11 | 0 | 2.2 | 3.2 | 1.5 | 0.9574 |
| 12 | 0 | 2.7 | 3.3 | 1.2 | 0.9611 |
| 13 | 0 | 2.2 | 5.1 | 2.3 | 0.9533 |
| 14 | 0 | 2.2 | 3.6 | 1.6 | 0.9513 |
| 15 | 0 | 1.8 | 4.0 | 2.2 | 0.9508 |
| 16 | 10 | 3.5 | 5.1 | 1.5 | 0.9520 |
| 17 | 20 | 3.8 | 5.9 | 1.6 | 0.9579 |
| 18 | 40 | 4.0 | 6.3 | 1.6 | 0.9543 |

[a]Pounds of hydrogen on the reactor.

As shown in Table IV, the end group analysis by IR spectroscopy reveals a vinyl to methyl end group ratio of ca. 1:2. This demonstrates the presence of some branching, presumably caused by an isomerization mechanism, and the utilization of either β-hydrogen elimination or olefin transfer as the termination mechanisms even in the presence of hydrogen. Run numbers 16, 17 and 18 show increased numbers of vinyl and methyl end groups per 1000 carbons as the molecular weight of the polymer decreased, yet the relative ratio of the end groups remained constant. Therefore, as is quite common for chromium catalysts, the hydrogenation termination mechanism does not appear to be in operation.

Olefin Production

All polymers directly removed from the batch reactor contained heavy olefin odors. A weight loss of 22 through 45% was found when the weight of polymer directly after removal from the reactor was compared with the weight after placing the polymer in a vacuum oven. Assuming that the weight loss consists totally of α-olefins, this catalyst does not incorporate α-olefins very well because the resulting polymer densities were still relatively high. In agreement with this, the addition of 1-hexene to a polymerization run did not result in a substantial decrease in polymer density (0.0018 g/cc), as shown in Table V. A similar addition of 1-hexene to a polymerization run using a Tergel catalyst (870° C./air, 350° C./CO) results in a density drop of 0.0100 g/cc.

TABLE V

| Run No. | Addition of 1-Hexene 1-Hexene (g) | Density (g/cc) |
|---|---|---|
| 9 | 0 | 0.9536 |
| 19 | 40 | 0.9518 |

Final Calcination

The polymerization set forth in Table I above as Run No. 6 was repeated (Run No. 19) using a phosphated alumina supported catalyst identical to that used in Run No. 6 except that as a final preparation step, the catalyst was calcined in air at 600° C. for a time period of 2 hours. The results of the run and tests conducted on the polymer produced are set forth in Table VI below as is Run No. 6 from Table I for comparison purposes.

TABLE VI

| Run No. | Support | Temp. (°C.) | Productivity (g/g/hr) | MI (g/10 min.) | HLMI (g/10 min.) | Density (g/cc) |
|---|---|---|---|---|---|---|
| 5 | $P/Al_2O_3$ | 85 | 566 | 0.011 | 0.016 | 0.9484 |
| 19[a] | $P/Al_2O_3$ | 85 | 2426 | 0.030 | 1.770 | 0.9543 |

[a]Catalyst calcined in air at 600° C. for a time period of 2 hours.

From Table V it can be seen that improved productivity and polymer properties were obtained when the supported bis-(trimethylsilylamide) chromium catalyst was calcined prior to use.

Thus, the present invention is well adapted to carry out the objects and attain the ends and advantages mentioned as well as those inherent therein. While numerous changes in components, procedures and process steps may be made by those skilled in the art, such changes are encompassed within the spirit of this invention as defined by the appended claims.

What is claimed is:

1. A process for preparing polyolefins comprising contacting one or more olefins with a catalytic amount of a trialkylsilylamide-chromium complex at polymerization conditions; said complex being supported on an organic refractory compound selected from the group consisting of inorganic oxides and metal phosphates.

2. The process of claim 1 wherein said olefins are comprised of ethylene alone or ethylene and a minor amount of a higher olefin.

3. The process of claim 2 wherein said trialkylsilylamide-chromium complex is represented by the formula:

$$Cr[N(SiR_3)_2]_2(L)_2$$

wherein R is an alkyl radical having from 1 to 4 carbon atoms and L is an ether.

4. The process of claim 3 wherein L is tetrahydrofuran.

5. The process of claim 5 wherein said inorganic refractory compound is selected from the group consisting of phosphated alumina, silica, fluorinated silica-alumina, aluminum phosphate and fluorinated alumina.

6. The process of claim 4 wherein said trialkylsilylamide-chromium complex is supported on phosphated alumina.

7. The process of claim 6 which is conducted under particle forming conditions at a temperature in the range of from about 60° C. to about 110° C. and a pressure in the range of from about 250 psig to about 1000 psig. from about 60° C. to about 110° C. and a pressure in the range of from about 250 psig to abut 1000 psig.

8. A process for preparing polyolefins comprising the steps of:

(a) contacting an activated inorganic refractory compound with a bis(trialkylsilylamide) chromium complex under conditions whereby said complex is adsorbed on said inorganic refractory compound thereby forming a supported catalyst; and (b) contacting one or more olefins with a catalytic amount of said supported catalyst at polymerizing conditions thereby forming said polyolefins.

9. The process of claim 8 wherein said bis-(trialkylsilylamide) chromium complex is bis-(trimethylsilylamide) chromium tetrahydrofuranate.

10. The process of claim 8 wherein said supported catalyst is calcined in air at a temperature in the range of from about 300° C. to about 800° C. for a time period in the range of from about 0.5 hours to about 24 hours prior to carrying out step (b).

11. The process of claim 8 wherein said olefins are comprised of ethylene alone or ethylene and a minor amount of a higher olefin.

12. The process of claim 8 wherein said inorganic refractory compound is selected from the group consisting of inorganic oxides and metal phosphates.

13. The process of claim 12 wherein said inorganic refractory compound is selected from the group consisting of phosphated alumina, silica, fluorinated silica-alumina, aluminum phosphate and fluorinated alumina.

14. The process of claim 9 wherein said inorganic refractory compound is phosphated alumina.

15. The process of claim 14 wherein said supported catalyst is calcined in air at a temperature in the range of from about 300° C. to about 800° C. for a time period in the range of from about 0.5 hours to about 24 hours prior to carrying out step (b).

16. The process of claim 15 which is conducted under particle forming conditions at a temperature in the range of from about 60° C. to about 110° C. at a pressure in the range of from about 250 psig to about 600 psig.

* * * * *

UNITED STATES PATENT AND TRADEMARK OFFICE

CERTIFICATE OF CORRECTION

PATENT NO. : 5,137,997

DATED : August 11, 1992

INVENTOR(S) : Brian K. Conroy et al.

It is certified that error appears in the above-identified patent and that said Letters Patent is hereby corrected as shown below:

Column 5, line 34, delete "F/SiO2/Al2O3" and substitute --$F/SiO_2/Al_2O_3$ -- therefor;

Column 6, line 12, delete "P/Al2O3" and substitute --$P/Al_2O_3$-- therefor;

Column 6, line 16, delete "P/Al2O3" and substitute --$P/Al_2O_3$-- therefor;

Column 8, line 35, delete "organic" and substitute --inorganic-- therefor;

Column 8, line 49, delete "5" and substitute --1-- therefor; and

Column 8, lines 60 and 61, after "." first occurrence, delete "from about 60°C. to about 110°C. and a pressure in the range of from about 250 psig to about 1000 psig."

Signed and Sealed this

Twenty-eighth Day of September, 1993

Attest:

BRUCE LEHMAN

*Attesting Officer* *Commissioner of Patents and Trademarks*